United States Patent Office 3,849,497
Patented Nov. 19, 1974

3,849,497
THIOMETHYLATED BENZOPHENONES
Hans-Georg Heine, and Hans-Jurgen Rosenkranz, Krefeld, and Hans Rudolph, Krefeld-Bockum, Germany, assignors to Bayer Aktiengesellschaft, Leverkusen, Germany
No Drawing. Filed Nov. 2, 1972, Ser. No. 303,121
Claims priority, application Germany, Nov. 5, 1971, P 21 55 000.5
Int. Cl. C07c 49/80, 49/82
U.S. Cl. 260—591          1 Claim

ABSTRACT OF THE DISCLOSURE

The invention relates to thiomethylated benzophenones of the general formula

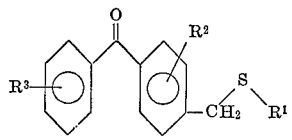

and to a photopolymerisable composition concerning the benzophenones as photoinitiators.

---

The subject of the present invention are thiomethylated benzophenones of the formula

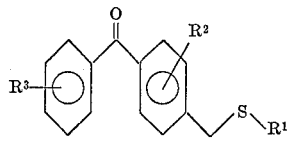

in which $R^1$ denotes aryl or aralkyl which is optionally substituted by alkyl, halogen and/or alkoxyl, or the p-benzoylbenzyl radical,
$R^2$ denotes hydrogen or alkyl and
$R^3$ denotes hydrogen, alkoxyl or methyl which is optionally substituted by $-SR^1$.

$C_1-C_5$-alkyl radicals are preferred; preferred alkoxy radicals are the methoxyradical and the thoxy radical, preferred aryl radicals are the phenyl radical and the naphthyl radical, preferred aralkyl radicals are the benzyl radical and the phenethyl radical, and chlorine and bromine are preferred as halogen substituents.

Examples of such compounds are:

| | Melting Point |
|---|---|
| 4-(Phenylthiomethyl)-benzophenone | 52–54° C. |
| 4-[(4″-tert.-Butylphenyl)thiomethyl]-benzophenone | 75–76° C. |
| 4-(Benzylthiomethyl)-benzophenone | 64–65° C. |
| 4-[(2″,4″,5″-Trichlorophenyl)-thiomethyl]-benzophenone | 115–117° C. |
| 4-(Pentachlorophenylthiomethyl)-benzophenone | 125–127° C. |
| 4,4′-Di-(pentachlorophenylthiomethyl)-benzophenone | 159–161° C. |
| 4,4′-Di-[(4″-tert.-butylphenyl)-thiomethyl]-benzophenone | 142–144° C. |
| 4,4′-Di-[(4″-chlorophenyl)thiomethyl]-benzophenone | 143–144° C. |
| 4-[(4″-Benzoylbenzyl)thiomethyl]-benzophenone | 125–126° C. |

A further subject of the invention is the use of these compounds, especially of the 4-(arylthiomethyl)- or 4,4′-di-(arylthiomethyl)-benzophenones as initiators for the photopolymerisation of vinyl compounds or of their mixtures or of mixtures of vinyl compounds and unsaturated polyesters.

It is known that the photopolymerisation of unsaturated compounds can be substantially accelerated by initiators. The compounds hitherto used for this purpose have at various times been discussed in summarising publications, as, for example, by Ch. M. McClosky and J. Bond (Ind. and Eng. Chem. 47, 2125 (1955)) and G. Delzenne (Ind. chim. Belg. 24, 739 (1959)). The strong substrate specificity of the known photoinitiators is a characteristic feature.

The compounds according to the invention are in particular distinguished by universal applicability and by high reactivity towards practically all photopolymerisable substances, in particular also under the action of UV light of long wavelengths. They are generally used in amounts of about 0.1% by weight to about 10% by weight, preferably of about 0.5% by weight to about 2% by weight, relative to the total weight of the particular compound or compounds to be polymerised. The most effective rays for initiating the polymerisation are those with wavelengths of 2,500 to 4,000 A. In addition to sunlight, mercury, tungsten and xenon lamps as well as certain fluorescent lamps can thus above all serve as light forces.

Suitable monomers which can be photopolymerised excellently with these initiators are, for example, methacrylic acid esters, vinyl esters, vinyl halides, vinyl ketones, vinyl ethers, vinyl cyanides, vinylidene halides and styrene, as well as mixtures of different monomers and mixtures of monomers with unsaturated polyesters which contain radicals of $\alpha,\beta$-unsaturated dicarboxylic acids and, optionally, allyl ether groups.

As examples of suitable monomers there may be mentioned vinyl chloride, vinylidene chloride, vinyl methyl ketone, acrolein, acrylic acid methyl ester, methacrylic acid ethyl ester, acrylamide, methacrylamide, acrylonitrile, methacrylonitrile, chloroprene and vinyl-ethyl-ether.

The mixtures, stabilised in the usual manner, of unsaturated polyesters and copolymerisable monomeric compounds can be photopolymerised particularly advantageously by the initiators according to the invention, and here unsaturated polyesters are to be understood as the polycondensation products of $\alpha,\beta$-unsaturated dicarboxylic acids such as maleic acid, fumaric acid, itaconic acid, mesaconic acid and citraconic acid, with polyols such as ethylene glycol, diethylene glycol, propanediol, butanediol, hexanediol, trimethylolpropane and pentaerythritol. A part of the unsaturated acids can be replaced by saturated acids, for example succinic acid, glutaric acid, adipic acid, phthalic acid, tetrachlorophthalic acid, hexachloroendomethylenetetrahydrophthalic acid and trimellitic acid. Further modifications are possible by incorporation of monohydric alcohols such as butanol, butylglycol and tetrahydrofurfuryl alcohol, and by incorporation of monobasic acids, such as benzoic acid, oleic acid, linseed oil fatty acid and castor fatty acid. So-called air-drying moulding compositions, which apart from the radicals of $\alpha,\beta$-unsaturated dicarboxylic acids also contain $\beta,\gamma$-unsaturated ether radicals, whether as constituents of the polyesters, say according to Auslegeschrift (Published Specification) 1,024,654, or as a constituent of further mixing components, say according to Patent 1,067,210 and Auslegeschrift (Published Specification) 1,081,222, can also be polymerised by the photoinitiators according to the invention.

Accordingly, a further subject of the invention are photopolymerisable moulding and coating compositions, especially compositions which can be cured by UV irradiation, of mixtures, stabilised in the usual manner, of unsaturated polyesters and copolymerisable monomeric compounds with a content of the thiomethylated benzophenones according to the invention. The usual inhibitors, for example hydroquinone, in the known amounts, serve for stabilisation. In manufacturing the moulding and coating compositions which can be cured by photopolymerisation, the additives or fillers customary in polyester chemistry, such as paraffin or wax, UV-absorbers, agents for conferring thixotropy and also glass fibers, synthetic fibers, silica and talc, can be present.

The photopolymerisation can be carried out in bulk, in solution or as an emulsion polymerisation. The preferred field of use is the manufacture of coatings on the most diverse substrates, for example on wood, on metals, on plastics and on textiles.

The compounds according to the invention can be manufactured in a manner which is in itself known (see J. Amer. Chem. Soc. 68, 2159 (1946)) by alkylation of mercaptans with halogenomethyl-benzophenones in the presence of alkali alcoholates or caustic alkali solutions or of a base which binds hydrogen halide. A milder and in some cases more advantageous procedure is to react the reactants in dipolar aprotic solvents, such as, for example, in dimethylformamide or in dimethylsulphoxide, in the presence of an aqueous alkali base, for example sodium hydroxide solution or potassium hydroxide solution. For this, temperatures of between 20 and 25° C. in general already suffice.

As acylated benzyl halides it is possible to employ, for example, the following halogenomethylated benzophenones: 4 - chloromethylbenzophenone, 4 - bromomethylbenzophenone, 4 - chloromethyl-4'-methylbenzophenone, 4,4'-dichloromethylbenzophenone, 4,4' - dibromomethylbenzophenone, and 4 - bromomethyl-3-methylbenzophenone.

As mercaptans it is possible to use: thiophenol, 2,4,5-trichlorothiophenol, benzylmercaptan, pentachlorothiophenol, 4-tert.-butylthiophenol, 4-methoxythiophenol, 4-chlorothiophenol and hydrogen sulphide in the form of the sodium salt ($Na_2S$).

Example 1

A solution of 55 g. of thiophenol, 20 g. of sodium hydroxide, 500 ml. of ethanol and 500 ml. of water is mixed with 138 g. of 4-bromomethylbenzophenone and the mixture is heated under reflux for 45 minutes. After filtering, concentrating the filtrate in vacuo and crystallising the residue from ether/n-hexane, 142 g. of 4-(phenylthiomethyl)-benzophenone are obtained as colourless crystals of melting point 52–54° C.

Calculated for $C_{20}H_{16}OS$ (304.4): C, 78.9; H, 5.3; O, 5.3; S, 10.5. Found: C, 78.7; H, 5.1; O, 5.5; S, 10.6.

Example 2

A mixture of 14.4 g. of sodium hydroxide, 100 g. of 4-bromomethylbenzophenone, 101.5 g. of pentachlorothiophenol, 750 ml. of ethanol and 250 ml. of water is heated under reflux for 1 hour. Thereafter the reaction mixture is poured onto ice and the precipitate is filtered off and recrystallised from n-butanol. 130 g. of 4-(pentachlorophenylthiomethyl)-benzophenone of melting point 125–127° C. are obtained.

Calculated for $C_{20}H_{11}Cl_5OS$ (476.6): C, 50.4; H, 2.3; Cl, 37.2; O, 3.4; S, 6.7. Found: C, 50.3; H, 2.1; Cl, 37.1; O, 3.4; S, 6.9.

Example 3

90 g. of sodium hydroxide in a little water (40% strength solution) are added dropwise, at 20° C., to a solution of 280 g. of 4,4'-dichloromethylbenzophenone and 340 g. of 4-tert.-butylthiophenol in 1,500 ml. of dimethylformamide. After stirring for 2 hours at 20° C., excess dimethylformamide (900 ml.) is stripped off in vacuo, the residue is stirred into ice water and the precipitate is filtered off and recrystallised from alcohol, with the addition of ethyl acetate (10%). 199 g. of 4,4' - di-[(4''-tert.-butylphenyl)thiomethyl]-benzophenone of melting point 142–144° C. are obtained.

Calculated for $C_{35}H_{38}OS_2$ (538): C, 78.1; H, 7.1; S, 11.9. Found: C, 77.8; H, 7.2; S, 11.8.

Example 4

96 g. of sodium sulphide in 135 ml. of water are added dropwise to a solution of 184.6 g. of 4-chloromethylbenzophenone in 500 ml. of dimethylformamide at 20° C., whilst stirring. After 2 hours, excess dimethylformamide (300–400 ml.) is distilled off and the residue is poured onto ice. Crystallisation of the precipitated 4[(4''-benzoylbenzyl)thiomethyl]-benzophenone from carbon tetrachloride yields 267 g. of pale yellow-coloured crystals of melting point 125–126° C.

Calculated for $C_{28}H_{24}O_2S$ (424): C, 79.6; H, 5.2; S, 7.6. Found: C, 79.4; H, 5.3; S, 7.8.

Example 5

$3 \times 10^{-4}$ mol of initiator are added to 15 g. portions of distilled acrylonitrile and these, together with the corresponding samples which contain 4-methylbenzophenone, phenacyl chloride or no initiator, are exposed in test tubes (16 cm. x 1.5 cm.) for 10 minutes to a mercury high pressure lamp (Philips HPK 125 W) in the photochemical reactor PR-20 of Messrs SEM Brückl (Munich) at 20° C., using a GWCa filter glass channel (which transmits above $\lambda > 330$ nm.). Thereafter the reaction solutions are immediately transferred into a flask with 50 ml. of methylene chloride in which 0.1 g. of toluhydroquinone are dissolved, and are concentrated at $10^{-2}$ mm. Hg and dried to constant weight at 80° C./$10^{-2}$ mm. Hg.

| Initiator: | Amount of polymer (percent by weight) |
|---|---|
| None | 0 [a] |
| 4-Methylbenzophenone | 0 [a] |
| 4-[(4''-tert.-butylphenyl)thiomethyl]-benzophenone | 6 [b] |
| 4-(Pentachlorophenylthiomethyl)-benzophenone | 3 [b] |
| 4,4'-Di-[(4''-tert.-butylphenyl)-thiomethyl]-benzophenone | 8 [b] |
| 4,4'-Di-[(4''-chlorophenyl)-thiomethyl]-benzophenone | 7 [b] |
| Phenacyl chloride | 0 [a] |

[a] Duration of exposure: 60 minutes.
[b] When using a GVW filter glass channel (which transmits above $\lambda > 360$nm.), practically the same amounts of polymer are obtained.

Example 6

15 g. portions of the vinyl monomers indicated in the table below are mixed with 0.1 g. of 4-[(4''-tert.-butylphenyl)thiomethyl]-benzophenone and exposed, together with the corresponding samples which do not contain an initiator, in test tubes (16 cm. x 1.5 cm.), under nitrogen, in the apparatus indicated in Example 5. The change in the samples on exposure is shown in the table below.

| | Properties of the exposed samples | |
|---|---|---|
| Vinyl monomer | With sensitizer, after— | Without sensitizer |
| Acrylic acid ethyl ester | 15 min., solidified glass | 60 min. no change. |
| Acrylonitrile | 5 min., colorless polymer. | Do. |
| Acrylic acid amide [a] | do | Do. |
| Methacrylic acid methyl ester | 10 min., solidified glass | Do. |
| Maleic anhydride/styrene, 1:5 | 15 min., solidified glass | |

[a] 25 percent strength by weight solution in methanol.

Example 7

An unsaturated polyester manufactured by polycondensation of 152 parts by weight of maleic anhydride, 141 parts by weight of phthalic anhydride and 195 parts by weight of 1,2-propanediol, is mixed with 0.045 parts by weight of hydroquinone and dissolved in styrene to give a 65 percent strength by weight solution. To 100 parts by weight of this form in which the resin is delivered are added 2 parts by weight of 4-(pentachlorophenylthiomethyl)-benzophenone, 20 parts by weight of styrene and 1 part by weight of a 10 percent strength by weight solution of paraffin (melting point 52–53° C.) in toluene. This solution is applied to a glass plate by means of a film spreader (500µ) and is exposed with a mercury high pressure lamp (Quarzlampengesellschaft mbH, Hanau, Type S 500) at a distance of 10 cm. The coating shows a paraffin bleeding-out time of 70 seconds and attains its final hardness (>6 H pencil hardness) after 12–14 minutes.

What we claim is:
1. Thiomethylated benzophenones of the formula

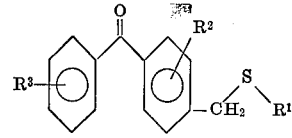

wherein $R^1$ is phenyl, naphthyl, benzyl, phenethyl or one of said radicals substituted by alkyl having 1 to 5 carbon atoms, chlorine, bromine, methoxy or ethoxy; $R^2$ is hydrogen or alkyl having 1 to 5 carbon atoms and $R^3$ is hydrogen, methoxy, ethoxy, methyl or —$CH_2$—$SR^1$.

No references cited.

DANIEL D. HORWITZ, Primary Examiner

U.S. Cl. X.R.

204—159.15, 159.22, 159.24